(12) United States Patent
Wada

(10) Patent No.: US 6,291,083 B1
(45) Date of Patent: Sep. 18, 2001

(54) STEEL PRODUCT WITH PLATING LAYERS

(75) Inventor: Shizuo Wada, Koga (JP)

(73) Assignee: Sanoh Kogyo Kabushiki Kaisha, Ibaraki-Ken (JP)

(*) Notice: Subject to any disclaimer, the term of this patent is extended or adjusted under 35 U.S.C. 154(b) by 0 days.

(21) Appl. No.: 09/490,689

(22) Filed: Jan. 24, 2000

(30) Foreign Application Priority Data

Jan. 25, 1999 (JP) ................................. 11-015994

(51) Int. Cl.[7] .................. B32B 15/20; F16L 9/02; F16L 11/127
(52) U.S. Cl. .................. 428/632; 428/658; 428/675; 428/678
(58) Field of Search .................. 428/632, 675, 428/678, 658

(56) References Cited

U.S. PATENT DOCUMENTS 4,418,125 * 11/1983 Henricks .
5,275,892 * 1/1994 Hyner et al. .
5,422,192   6/1995 Takahashi et al. .................. 428/632

FOREIGN PATENT DOCUMENTS

| 2225591 | * | 6/1990 | (GB) . |
| 2245283 | * | 1/1992 | (GB) . |
| 56035790 | | 4/1981 | (JP) . |
| 60128286 | | 7/1985 | (JP) . |
| 02120034 | | 5/1990 | (JP) . |
| 03047987 | | 2/1991 | (JP) . |
| 10121267 | | 5/1998 | (JP) . |

* cited by examiner

Primary Examiner—Deborah Jones
Assistant Examiner—Jason Savage
(74) Attorney, Agent, or Firm—Ladas and Parry

(57) ABSTRACT

A Ni plating layer 3, a Cu plating layer 11, a Zn—Ni alloy plating layer 4 and a chromate layer 5 are formed sequentially in that order on the outer surface of a steel base 2. The Cu plating layer 11 interposed between the Ni plating layer and the Zn—Ni plating layer seals up pinholes in the Ni plating layer and enhances the sacrificial corroding action of the Zn—Ni alloy plating layer.

6 Claims, 2 Drawing Sheets

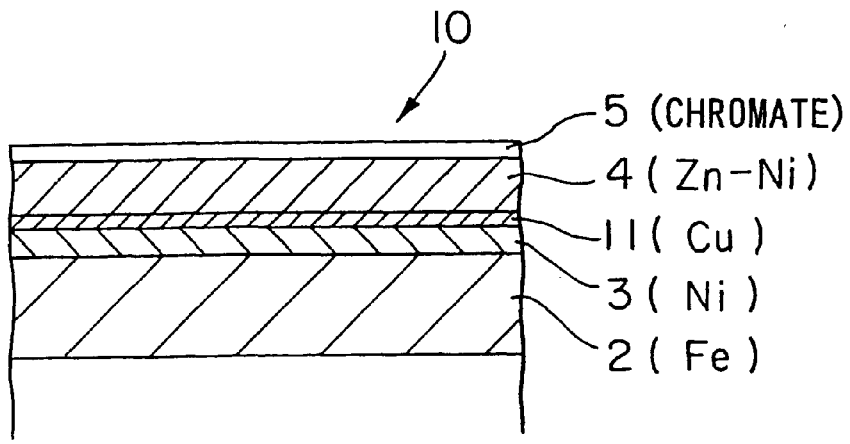
F I G. 1
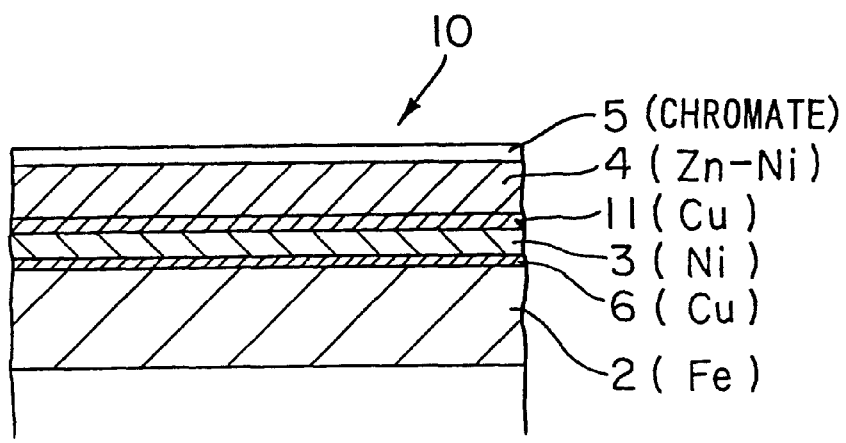
F I G. 2

STEEL PRODUCT WITH PLATING LAYERS

BACKGROUND OF THE INVENTION

1. Field of the Invention

The present invention relates to a steel product with plating layers and, more particularly, to a steel product with plating layers suitable for use as automotive parts, such as pipes.

2. Description of the Related Art

Automotive pipes include, for example, fuel pipes, brake pipes, air conditioner pipes, power steering pipes, lubricating pipes and cooling water pipes. Pipes with plating layers (hereinafter referred to simply as "plated pipes") are used as those automotive pipes to meet the requirements for corrosion resistance and strength. As shown in FIG. 4, a known plated pipe 1 has a steel pipe 2, a Ni plating layer 3 as a lower inner layer formed on the outer surface of the steel pipe 2, a Zn—Ni alloy plating layer 4 as an outer layer formed on the Ni plating layer 3, and a chromate layer 5 as an outermost layer formed on the Zn—Ni alloy plating layer 4.

When this known plated pipe 1 is used in a corrosive environment for a long time, portions of the steel pipe 2 corresponding to pinholes in the Ni plating layer 3 are corroded and red rust is formed on those portions. As the portions are further corroded, cavities are formed by pitting in those portions of the steel pipe 2 on which rust is formed. Eventually, through holes are formed in the steel pipe 2 and, consequently, the plated pipe 1 looses its function.

SUMMARY OF THE INVENTION

The present invention has been made to solve such a problem and it is therefore an object of the present invention to provide a highly corrosion-resistant plated steel product.

According to the present invention, a plated steel product is provided which has an intermediate Cu plating layer interposed between a Ni plating layer as an inner layer and a Zn—Ni alloy plating layer as an outer layer.

BRIEF DESCRIPTION OF THE DRAWINGS

FIG. 1 is a fragmentary sectional view of a plated steel pipe in a first embodiment according to the present invention;

FIG. 2 is a fragmentary sectional view of a plated steel pipe in a second embodiment according to the present invention;

DESCRIPTION OF THE PREFERRED EMBODIMENTS

Figure 4:
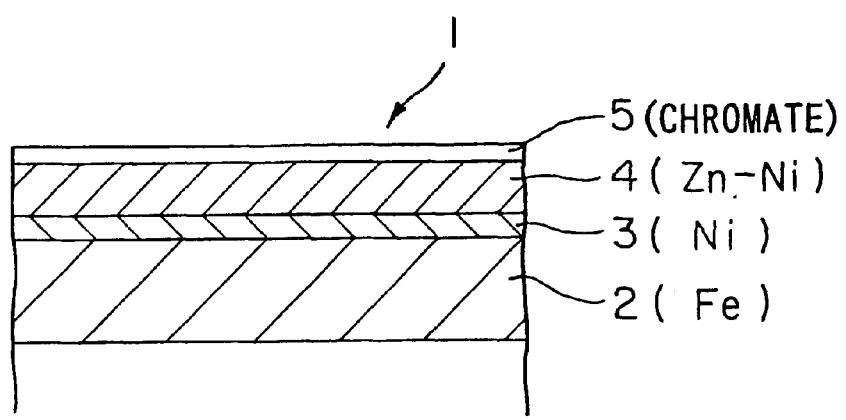
FIG. 4 is a fragmentary sectional view of a conventional plated pipe.

A plated steel product according to the present invention will be described with reference to FIG. 1.

Referring to FIG. 1, a plated steel pipe 10, as an example of the plated steel product, has a steel pipe 2 as a core (i.e., base member), a 2–6 µm thick (typically about 3 µm thick) Ni plating layer 3 formed as an inner layer on the outer surface of the steel pipe 2, a Cu plating layer 11 of a thickness not smaller than 0.1 µm (preferably 0.5–1 µm thick) formed as an intermediate layer on the Ni plating layer 3, and a 5–20 µm thick (typically about 8 µm thick) Zn—Ni ally plating layer 4 formed as an outer layer on the Cu plating layer 11. The Zn—Ni ally plating layer 4 contains 5–15 wt %, typically 6–8 wt % of nickel.

The Ni plating layer 3 may be formed by either an electroless plating process or an electroplating process. When formed by an electroless plating process, the Ni plating layer 3 contains P (phosphorus). Such Ni—P alloy plating should be considered to be Ni plating in accordance with the present invention.

The Cu plating layer 11 is formed by an electroplating process. The Zn—Ni alloy plating layer 4 is formed by an electroplating process.

A chromate layer 5, i.e., a chromate film, as an outermost layer, is formed on the Zn—Ni alloy plating layer 4 by a chromate treatment. The chromate layer 5 may be coated with a paint film.

The plated steel pipe 10 in this embodiment provided with the Cu plating layer 11 as an intermediate layer has improved corrosion resistance, for the reasons mentioned below.

(1) The Cu plating layer 11 having high covering power seals up pinholes in the Ni plating layer 3 (in other words, the pinholes in the Ni plating layer 3 are filled with Cu). Therefore, the penetration of corrosive substances, such as water, salt water and acid water, through the Ni plating layer 3 to the surface of the steel pipe 2 can be prevented or retarded. Consequently, time that is required for the surface of the steel pipe 2 to be corroded (rusted) and time that is required for red rust to be occurred on the surface of the plated steel pipe 10 are extended.

(2) Since Cu is nobler than Ni, the corrosion potential difference between the Zn—Ni alloy plating layer 4 and the Cu plating Layer 11 (when the Cu plating layer 11 is interposed between the Ni plating layer 3 and the Zn—Ni alloy plating layer) is greater than that between the Ni plating layer 3 and the Zn—Ni alloy plating layer 4 (when the Zn—Ni alloy plating layer 4 is formed directly on the Ni plating layer 3).

Consequently, the progress of pitting can considerably retarded even in a state where the steel pipe 2 is corroded and rust is formed over the surface of the plated steel pipe 10 because sacrificial corrosion regions in the Zn—Ni alloy plating layer 4 around rusted points expand.

Furthermore, since the Cu plating layer 11 is soft and highly ductile, the Cu plating layer 11 interposed between the Ni plating layer 3 and the Zn—Ni alloy plating layer 4 serves as a buffer layer. Therefore, the layers over the steel pipe 2 hardly peel and crack when the steel pipe is impacted. The Cu plating layer 11 improves the impact resistance of the layers, particularly, in cold conditions.

In the embodiment shown in FIG. 1, the Ni plating layer 3 is formed directly on the surface of the steel pipe 2. However, additional plating layers, e.g., a Cu plating layer 6, may be provided between the surface of the steel pipe 2 and the Ni plating layer 3, as shown in FIG. 2. In this case, a commercially available steel pipe with a Cu plating layer may be used.

The embodiment shown in FIG. 2 is the same in effect as the embodiment shown in FIG. 1. That is, an additional layer, such as the Cu plating layer 6, may be interposed between the outer surface of the steel pipe 2 and the Ni plating layer 3, provided that the additional layer does not affect adversely the effect of the plating layers formed by sequentially forming the Ni plating layer 3, the Cu plating layer 11 and the Zn—Ni alloy plating layer 4 in improving the corrosion resistance of the plated steel pipe 10.

Although the present invention has been described as applied to the steel pipe provided with the plated layers, the plated layers may be applied to the prevention of corrosion of various kinds of steel materials including flat steel sheets, welded steel structure, block shaped parts (such as bolts and nuts) or the like.

EXAMPLES

Examples of the present invention will be described hereinafter.

Example 0.69 mm thick steel sheets of SPCC (low-carbon cold rolled steel sheet specified in JIS G-3141) were prepared.

Each of the steel plates was coated with a 3.1 µm thick Ni plating layer. The Ni plating layer was formed by an electroless plating process (ENIPACK OLC Process, Ebara-Udylite Co. Ltd. Japan), in which the steel sheet was immersed in a plating bath of 90° C. for 20 minutes.

Next, a 0.8 µm thick Cu plating layer was formed on the Ni plating layer by an electroplating process, in which the steel sheet was immersed in a plating bath of 35° C. containing 25 g/l CuCN and 40 g/l of NaCN for 100 seconds with a current density of 2 A/dm$^2$.

Next, a 7.4 µm thick Zn—Ni alloy plating layer was formed by an electroplating process, in which the steel plate was immersed in a plating liquid "STRON Ni Zinc" (a product of Nippon Hyomen Kagaku Co. Ltd. Japan) of 23° C. for 22 minutes with a current density of 4 A/dm$^2$.

Next, a chromate layer was formed by an chromate treatment, in which the steel plate was immersed in a process bath of 25° C. containing 30 ml/l of "ZNC-980" (a product of Nippon Hyomen Kagaku Co. Ltd. Japan) for 40 seconds.

Comparative Example

The same sized steel sheet of SPCC was prepared. The steel plate was coated with 3.2 µm thick Ni plating layer under the same plating conditions as the Ni plating layer of the example. Next, a 7.7 µm thick Zn—Ni alloy plating layer was formed on the Ni plating layer under the same plating conditions as the Zn—Ni alloy plating layer of the example. Next, a chromate layer was formed under the same conditions as the chromate layer of the example.

The specimens in the example and the comparative example were subjected to "combined-cycle corrosion test (CCT)". In the test, one combined-cycle consisted of (1) salt water spraying, (2) hot air drying at 60° C. and (3) exposure to a humid atmosphere of 50° C. and 95% RH. Time for one combined-cycle was 24 hrs, and the combined-cycle was repeated.

Figure 3:
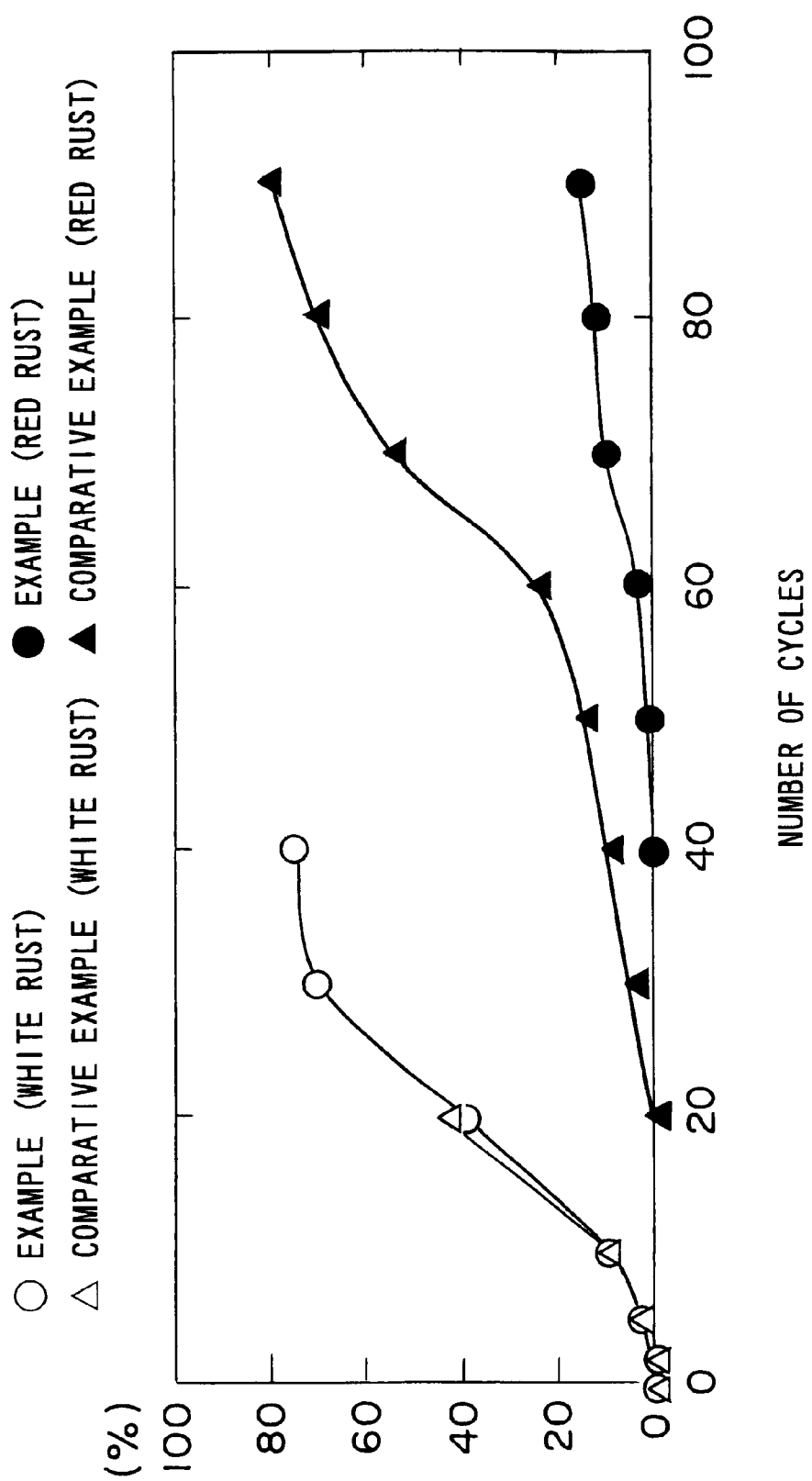
FIG. 3 is a graph showing the results of combined-cycle corrosion tests.

FIG. 3 is a graph showing the results of the combined-cycle corrosion test, in which the number of combined-cycles is measured on the horizontal axis, and the white rust area ratio, i.e., the ratio of surface area covered with white rust to the total surface area, and the red rust area ratio, i.e., the ratio of surface area covered with red rust to the total surface area, are measured on the vertical axis. As obvious from FIG. 3, the example and the comparative example are substantially the same in the formation of white rust, because the formation of white rust is dependent on the corrosion resistance of the Zn—Ni alloy plating layer.

On the contrary, the surface area covered with red rust in the example is far less than that in the comparative example. Whereas red rust started to form in the comparative example in the 30th cycle, the same started to form in the example in the 50th cycle. The rate of increase of the red rust area ratio of the example is far less than that of the comparative example. Whereas the red rust area ratio of the comparative example after the completion of the 90th cycle was as large as 80%, the same of the example after the completion of the 90th cycle was 15%.

The specimens in the example and the comparative example were examined for pitting after the completion of the 90th cycle. The specimens were cut and the remaining thickness of the steel sheets was measured by using an optical microscope. Three specimens in the example and the three specimens in the comparative example were used as sample specimens. The remaining thickness was measured at eighteen portions, at which red rust occurred, of each specimen.

The mean of the remaining thickness of the three sample specimens of the comparative example were 0.27 mm, 0.02 mm and 0.00 mm (through pits were formed), respectively. On the contrary, the mean of the remaining thickness of the three sample specimens of the example were 0.37 mm, 0.54 mm and 0.44 mm, respectively.

The test results proved that the plated layers of the present invention is by far the more excellent in rust resistance and pitting resistance than the conventional plated layers.

What is claimed is:

1. A plated steel product comprising:

a base member made of steel;

a Ni plating layer formed over a surface of the base member;

a Cu plating layer formed on the Ni plating layer; and a Zn—Ni alloy plating layer formed on the Cu plating layer.

2. The plated steel product according to claim 1, further comprising a second Cu plating layer formed on a surface of the base member, wherein the Ni plating layer formed on the second Cu plating layer.

3. The plated steel product according to claim 1, the Ni plating layer formed on a surface of the base member.

4. The plated steel product according to claim 1, wherein the Ni plating layer is formed by an electroless plating process.

5. The plated steel product according to claim 1, wherein the Ni plating layer is formed by a electroplating process.

6. The plated steel product according to claim 1, wherein a chromate layer is formed on the Zn—Ni plating layer.

* * * * *